United States Patent [19]

Shill

[11] Patent Number: 5,044,874
[45] Date of Patent: Sep. 3, 1991

[54] STACK DIVIDING MECHANISM FOR A CORRUGATED SHEET UNSTACKING AND FEEDING APPARATUS

[75] Inventor: David Shill, Spokane, Wash.

[73] Assignee: Thermoguard Equipment, Inc., Spokane, Wash.

[21] Appl. No.: 524,155

[22] Filed: May 16, 1990

[51] Int. Cl.$^5$ ............................................. B65G 59/02
[52] U.S. Cl. .................... 414/796; 414/796.8
[58] Field of Search ................ 414/790.3, 796, 796.8

[56] References Cited

U.S. PATENT DOCUMENTS

| | | | |
|---|---|---|---|
| 2,963,177 | 12/1960 | Shields | 414/796 X |
| 3,249,242 | 5/1966 | Zachow | 414/796 X |
| 4,119,219 | 10/1978 | Marschke | 414/796 |
| 4,700,941 | 10/1987 | Shill | 271/151 |
| 4,957,409 | 9/1990 | Fukao et al. | 414/796.8 X |
| 4,988,265 | 1/1991 | Schwab et al. | 414/796.8 |

FOREIGN PATENT DOCUMENTS 749779  7/1980  U.S.S.R. .............................. 414/796

OTHER PUBLICATIONS

"The Jumbo Feedmaster," (undated), published by Thermoguard Equipment, Inc., Spokane, Washington.

Primary Examiner—Robert J. Spar
Assistant Examiner—Janice Krizek
Attorney, Agent, or Firm—Wells, St. John & Roberts

[57] ABSTRACT

Successive blocks of corrugated sheets are divided from a large vertical stack by a combination of a horizontally movable pusher plate and a guiding ramp that lifts the front edge of each block of sheets upwardly and onto a receiving conveyor surface. The ramp is a hybrid that includes a powered cylindrical roller and an adjacent yieldably biased upright plate that is moved to an inclined position in response to initial movement of a block of sheets.

3 Claims, 2 Drawing Sheets

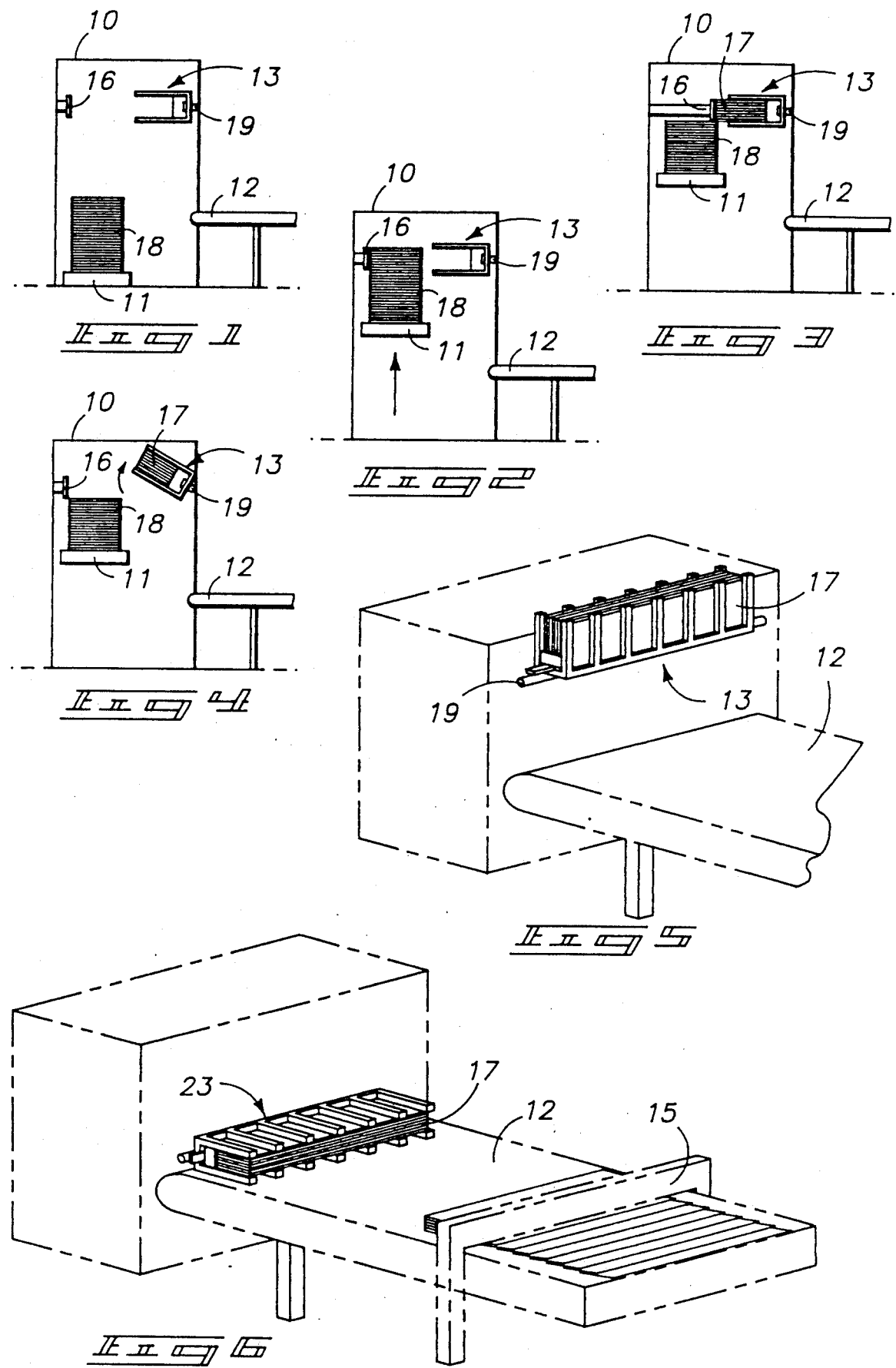

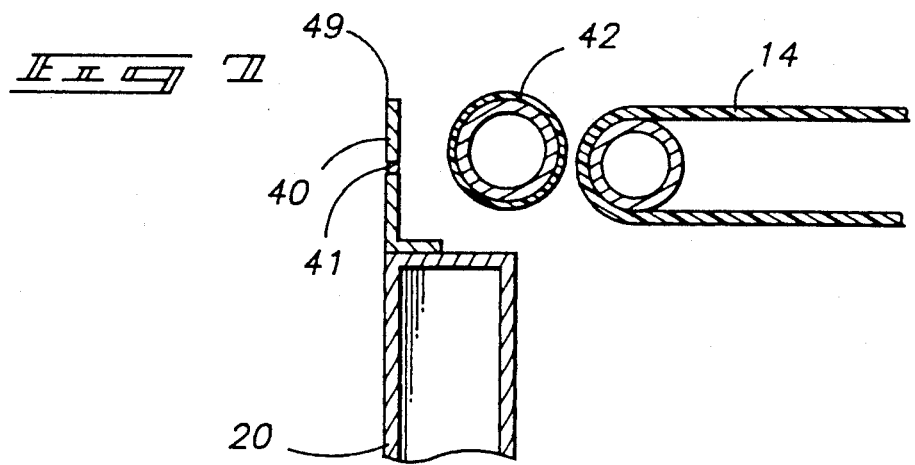
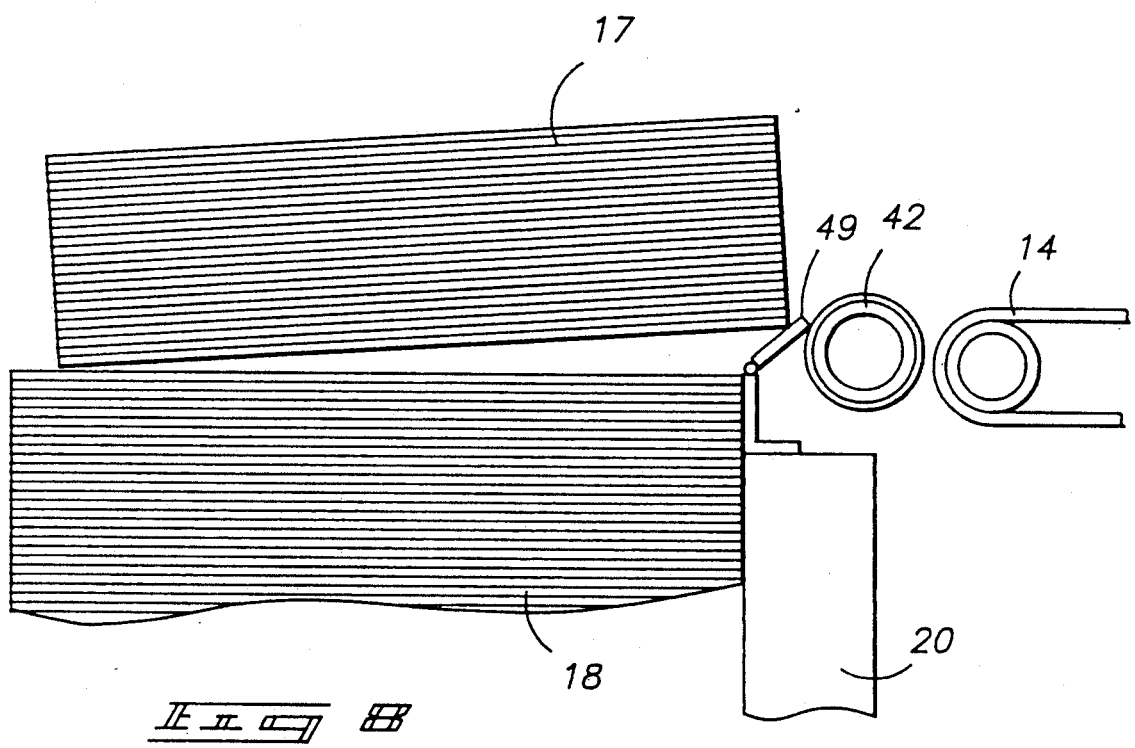

STACK DIVIDING MECHANISM FOR A CORRUGATED SHEET UNSTACKING AND FEEDING APPARATUS

TECHNICAL FIELD

The apparatus described herein pertains to the unstacking and pre-feeding of flat corrugated sheets in a shingled pattern along a moving path.

BACKGROUND OF THE INVENTION

In the manufacture of corrugated paper cartons or boxes, rectangular corrugated sheets or blanks are first produced in a machine known as a corrugator. The sheets are then stacked for storage and handling purposes. They are subsequently individually processed through a printer or a die cutter that either imprints each sheet or forms carton blanks to the requirements of a customer.

Printing machines and die cutters operate at very high rates of speed. Simply loading successive vertical stacks of the corrugated sheets into an infeed hopper for such a machine is ineffective because of the amount of physical labor required to place each stack accurately within the hopper. The amount of labor required would result in an interruption of the operation of the machinery being fed or running the machine at a reduced rate of speed.

The present machine and method assure that a continuous supply of corrugated sheets is maintained within the infeed hopper of a printing machine or a die cutting machine while operating at a high rate of speed. This is accomplished by unstacking the corrugated sheets and pre-feeding them to the receiving hopper of the sheet processing machinery in a continuous shingled manner at a delivery rate that will not interrupt operation of the sheet processing machinery.

Where the incoming sheets or blanks are handled in very large stacks, it has been found advisable to design machines that initially divide each stack into a plurality of smaller "blocks" which are then successively handled and shingled along a longitudinal path leading to the blank processing machinery being fed. After being divided, each block might be inverted or simply deposited on a feed conveyor leading to a shingle gate.

The division of a large stack of corrugated sheets or blanks into several equally-sized blocks requires accurate separation between successive blocks. Because of the many variations that can occur in production of corrugated sheets, as well as frictional and static electricity forces that can interfere with separation of a stack, sliding successive blocks of such sheets from the top of a stack often results in a "trailing sheet" being dragged partially across the stack under the removed block. The protruding edges of the trailing sheet can jam the machinery and result in unwanted stoppage of the machinery. The present disclosure is primarily concerned with elimination of such trailing sheets at the bottom of a divided block.

The present disclosure attacks the problem of trailing sheets in two ways. (1) It provides frictional forces at the top of the remaining stack of sheets to impede sliding movement of the top sheet. The frictional forces are applied by means of a roller on the block pusher that initiates movement of each block from the top of a stack. (2) It also provides an improved ramp for initially lifting each block from the remaining sheets in the stack.

BRIEF DESCRIPTION OF THE DRAWINGS

The preferred embodiment of the invention is illustrated in the accompanying drawings, in which:

FIG. 1 is a schematic side view illustrating receipt of a stack of sheets;

FIG. 2 is a similar view showing an elevated stack;

FIG. 3 is a similar view showing a block being shifted into an inverter;

FIG. 4 is a similar view showing pivotal movement of the inverter;

FIG. 5 is a schematic perspective view of the inverter in an upright position;

FIG. 6 is a similar view showing the inverter in a lowered position;

FIG. 7 is a sectional view through the upper end of a backstop in the preferred embodiment; and FIG. 8 is a view schematically illustrating division of a block.

DETAILED DESCRIPTION OF THE PREFERRED EMBODIMENT

The following disclosure of the invention is submitted in furtherance with the constitutional purpose of the Patent Laws "to promote the progress of science and useful arts" (Article 1, Section 8).

The machine shown in the drawings is designed for unstacking and pre-feeding of corrugated sheets. It works from vertical stacks in which such sheets are stored and handled prior to use in high speed processing machines relating to production of corrugated paperboard cartons, such as printers or die cutters. The illustrated machine directs the sheets in a shingled manner along a longitudinal path on a feed conveyor leading to the infeed hopper (not shown) of the downstream processing machinery.

FIGS. 1-6 diagrammatically illustrate the general operation of the sheet pre-feeding equipment to which this disclosure is directed.

In FIG. 1, a stack of sheets 18 is received on a vertically movable elevator 11. The elevator 11 supports each stack 18 of corrugated sheets and intermittently moves the stack 18 upwardly until the upper end of the stack reaches a predetermined elevation.

Elevator 11 also transversely positions each stack 18 laterally across the longitudinal path of the sheets on the feed conveyor 12. Such transverse positioning might be referenced to the centerline of the machine, to an off-center line or to a reference edge.

After being received and transversely positioned, stack 18 is raised elevationally by operation of elevator 11 to a block discharge position (FIG. 2). At this position, the uppermost sheets in the stack 18 are arranged between a block pusher 16 and the open throat of an inverter frame 13.

Block pusher 16 shifts each block of sheets 17 into a movable inverter frame 13, as shown in FIG. 3. The inverter frame 13 then swings 180 degrees about a pivot shaft 19 on framework 10, as shown in FIG. 4. FIG. 5 illustrates its vertical position during such swinging motion.

The inverted block is then lowered elevationally in preparation for discharge of the block 17 on the receiving end of feed conveyor 12 (FIG. 6). The sheets in each block subsequently engage a transverse shingle gate 15. They are drawn beneath the shingle gate 15 in overlapping, shingled array, illustrated to the right in FIG. 6.

The machine is mounted within a stationary supporting framework. The framework carries a vertically adjustable elevator 11 having transversely adjustable conveyor belts on which each full stack of corrugated sheets or blanks 18 is received. Elevator 11 raises the stack 18 a distance equal to the height of each block 17 to be discharged from the stack 18. The blocks 17 are then deposited upon one or more conveyors that move each block 17 along a longitudinal path.

In the illustrated machine, the blocks 17 are individually discharged into an inverter 13 including a conveyor at one of its sides. Where inversion is not required, the individual blocks 17 can be fed onto a receiving conveyor on an elevator (not shown) which then lowers them onto the feed conveyor 12. Where design of the machine permits, the blocks 17 can be fed directly onto the receiving end of feed conveyor 12.

The stack dividing mechanism for the corrugated sheet unstacking and feeding apparatus shown includes a powered conveyor 14 arranged along the longitudinal path of the machine. The conveyor has a receiving end adjacent to the stack 18 on elevator 11.

A transverse backstop 20 on the stationary framework of the machine is interposed between elevator 11 and the receiving end of conveyor 14. Each incoming stack 18 of corrugated sheets is moved against the backstop 20 so that one edge of the stack engages the facing surface of backstop 20.

A ramp means is located across the top of backstop 20. It is located at a position spaced from the receiving end of conveyor 14 for vertically separating each block 17 of sheets from a stack 18 on the elevator 11 as the block 17 is shifted horizontally toward the receiving end of the conveyor 14.

The ramp means works in conjunction with block pusher 16, which is located on framework 10 opposite to the ramp means. The block pusher 16 periodically shifts a block of sheets 17 from the top of a stack 18, over the ramp means, and onto the moving surface at the receiving end of conveyor 14.

The block pusher 16 includes an upright rectangular plate leading upwardly from a transverse lower edge. The lower edge is horizontal and is preferably located at an elevation intermediate the top and bottom elevations of the ramp means.

The rear edges of the block of sheets 17 are engaged by the front surface of the block pusher 16 as it moves across a stack of sheets 18. This results in a block of sheets 17 being shifted along the longitudinal path of the machine toward the receiving end of conveyor 14. The lower edge of the block pusher plate defines the bottom boundary of each block 17 being separated from an elevated stack of sheets 18. The block pusher 16 shifts the block 17 only partially across the stack 18. The front edge of the shifted stack will then slide upwardly over the inclined ramp means, bringing the lowermost surface of the block 17 into engagement with the conveyor 14. The ramp means adequately transfers the block of sheets regardless of warp or lack of warp.

The weight of the block transferred onto the conveyor 14 provides sufficient frictional engagement between the conveyor surface and the lower surface of the block to pull the remainder of the block along the intended path of the machine.

FIGS. 7 and 8 illustrate a preferred hybrid embodiment of the ramp means, including a powered cylindrical roller 42 having a high friction surface and an adjacent rectangular plate 40 having a low friction surface and pivotally mounted about a transverse horizontal axis by hinges 41. The rectangular plate 40 includes a horizontal transverse top edge 49. Cylindrical roller 42 is mounted between the plate 40 and the receiving end of the conveyor 14. Because the roller 42 has a high friction covering, the upper surface of conveyor 14 is elevationally positioned slightly below the periphery of the roller 42. This assures that the weight of each block will bear downwardly on roller 42 as it is being shifted from the stack of sheets.

The plate 40 is biased to a vertical position against fixed stops (not shown) by springs, such as coil springs included in the hinges 41. The springs are operably connected to the plate 40 for yieldably urging it to an upright position across the backstop 20. The biasing springs permit pivotal movement of the plate 40 about its transverse horizontal axis to move its top edge 49 toward the roller 42 in response to shifting of a block of sheets by the block pusher 16. When this occurs, the rear surface across plate 40 will be inclined and will serve as a low friction ramp to urge the block of sheets forwardly and upwardly onto the powered high friction surface of transverse roller 42.

The top edge 49, when the plate 40 is in its upright position, is at an elevation below that of the periphery of the roller 42, thereby always assuring that the bottom corner of each incoming block of sheets will directly engage the roller 42 to provide the frictional contact required to pull the block across the remainder of the stack from which it is delivered.

The spring biased plate 40 will constantly rub across the bottom surface of the lowermost sheet in each block of sheets being transferred across the powered roller 42. This rubbing action prevents any "trailing sheet" from moving over the edge 49 and onto the roller 42.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A stack dividing mechanism for a corrugated sheet unstacking and feeding apparatus that removes successive blocks of sheets from the top of a vertical stack and moves each block along a longitudinal path, comprising:

a framework;

a powered conveyor arranged along the longitudinal path on the framework, the conveyor having a moving surface extending from a receiving end;

elevator means on the framework for supporting a vertical stack of sheets and for intermittently moving the stack upwardly until the upper end of the stack reaches a predetermined elevation relative to the framework;

a transverse backstop interposed on the framework between the elevator means and the receiving end of the conveyor for abutment by one edge of a stack of corrugated sheets on the elevator means;

ramp means located across the top of the backstop at a position spaced from the receiving end of the conveyor for vertically separating each block of sheets from a stack on the elevator means as the block is shifted toward the receiving end of the conveyor; and block pusher means located on the framework on the side of the elevator means opposite the ramp means for periodically shifting a block of sheets from the top of a stack over the ramp means and onto the moving surface at the receiving end of the conveyor, the block pusher means including a transverse plate having a horizontal lower edge positioned at an elevation intermediate the top and bottom elevations of the ramp means;

the ramp means comprising:

a rectangular plate pivotally mounted on the backstop about a transverse horizontal axis, the plate including a horizontal transverse top edge;

a cylindrical roller rotatably mounted between the plate and the receiving end of the conveyor about a central transverse horizontal axis; and biasing means operably connected to the plate for yieldably urging it to an upright position, the biasing means further permitting pivotal movement of the plate about its transverse horizontal axis to move its top edge toward the roller in response to shifting of a block of sheets by the block pusher means.

2. The stack dividing mechanism of claim 1, wherein the periphery of the roller is elevationally above the moving surface at the receiving end of the conveyor.

3. The stack dividing mechanism of claim 1, wherein the top edge of the plate, when the plate is in its upright position, is at an elevation below the periphery of the roller.

* * * * *